United States Patent
Jang et al.

(10) Patent No.: US 8,770,492 B2
(45) Date of Patent: Jul. 8, 2014

(54) AIR CONDITIONER AND CONTROLLING METHOD THEREOF

(75) Inventors: Jae Dong Jang, Seoul (KR); Su Chang Woo, Seoul (KR); Mi Jin Jung, Seoul (KR); Ho Jung Kim, Seoul (KR); Ju Youn Lee, Seoul (KR); Choong Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 948 days.

(21) Appl. No.: 12/874,329

(22) Filed: Sep. 2, 2010

(65) Prior Publication Data

US 2011/0056673 A1    Mar. 10, 2011

(30) Foreign Application Priority Data

Sep. 4, 2009  (KR) .................. 10-2009-0083693

(51) Int. Cl.
| | | |
|---|---|---|
| G05D 23/19 | (2006.01) | |
| G01M 1/38 | (2006.01) | |
| F25B 29/00 | (2006.01) | |
| F24F 11/00 | (2006.01) | |

(52) U.S. Cl.
CPC ........... *F24F 11/006* (2013.01); *F24F 11/0012* (2013.01); *F24F 2011/0035* (2013.01); *F24F 2011/0036* (2013.01); *F24F 2011/0061* (2013.01); *F24F 2011/0063* (2013.01); *G05D 23/1904* (2013.01)
USPC ........... 236/46 C; 700/276; 165/201; 165/237

(58) Field of Classification Search
CPC ................ F24F 11/006; F24F 11/0012; F24F 2011/0035; F24F 2011/0036; F24F 2011/0061; F24F 2011/0063; G05D 23/1904
USPC .............. 236/46 C, 46 R; 165/201, 237, 267; 700/276, 278
See application file for complete search history.

(56) References Cited

U.S. PATENT DOCUMENTS 5,678,758 A * 10/1997 Takegawa et al. .......... 236/46 R
2008/0135634 A1    6/2008 Murakami et al.

FOREIGN PATENT DOCUMENTS

| EP | 1 279 901 | | 1/2003 |
|---|---|---|---|
| EP | 1279901 A2 | * | 1/2003 |
| JP | 06129687 A | * | 5/1994 |
| JP | 09170798 A | * | 6/1997 |

OTHER PUBLICATIONS

European Search Report issued in EP Application No. 10175074.3 dated Apr. 1, 2011.

* cited by examiner

*Primary Examiner* — Chen Wen Jiang
(74) *Attorney, Agent, or Firm* — KED & Associates, LLP (57) ABSTRACT

An air conditioner and a controlling method thereof are provided. The controlling method may include determining an initial operation temperature based on a received external input or setting, cooling or heating a room at the determined initial operation temperature for a preset initial operation time period, and thereafter increasing or decreasing the room temperature at a preset time interval.

15 Claims, 10 Drawing Sheets

AIR CONDITIONER AND CONTROLLING METHOD THEREOF

CROSS-REFERENCE TO RELATED APPLICATION(S)

This application claims priority under 35 U.S.C. §119 to Korean Application No. 10-2009-0083693 filed in Korea on Sep. 4, 2009, whose entire disclosure(s) is/are hereby incorporated by reference.

BACKGROUND

1. Field

This relates to an air conditioner and a controlling method thereof.

2. Background

Generally, air conditioners cool or heat a designated space, such as, for example, a room in a residence or office. Such an air conditioner may incorporate a refrigerating cycle including a compressor, an outdoor heat-exchanger, an expansion valve and an indoor heat-exchanger. Gaseous refrigerant compressed in the compressor is drawn into the outdoor heat-exchanger, phase-changed into a liquid refrigerant so as to emit heat to the outside, expanded via the expansion valve, and drawn into the indoor heat-exchanger. When the liquid refrigerant is evaporated, the refrigerant absorbs peripheral heat. When the gaseous refrigerant is changed into liquid, it exhausts heat. The heat exchanged air may be supplied to a room to adjust a temperature thereof.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to specific embodiments, examples of which are illustrated in the accompanying drawings. Wherever possible, the same reference numbers will be used throughout the drawings to refer to the same or like parts.

When operating an air conditioner, a desired room temperature may be set. Upon initiating the air conditioning process (for example, a cooling process), the room temperature may be high such that a cooling load may be relatively large. Because of that, an operational temperature may be set relatively low by the user to implement quick cooling. However, in an intermediate or final phase of the air conditioning, this lower temperature may cause the user to feel cold or unpleasant, and the user may change (increase) the operational temperature or turn off the air conditioner.

In other words, maintaining the low operation temperature (in a cooling operation) may eventually cause discomfort in the room as the air conditioning process is carried out without considering a human thermal condition. Furthermore, such continuous cooling (or heating) due to an excessively low cooling temperature (or an excessively high heating temperature) without considering a changing human thermal condition may cause excessive energy consumption. A controlling method of an air conditioner as embodied and broadly described herein may allow operation temperature and/or air flow to be adjusted based on human thermal adaptability.

Figure 1:
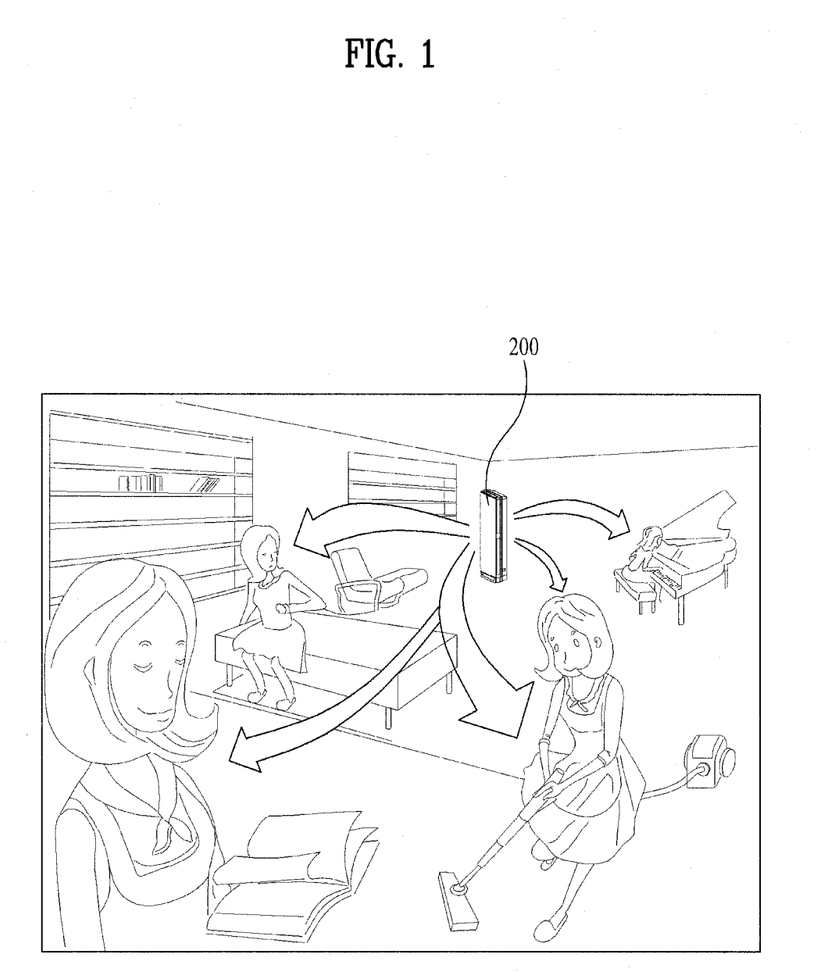
FIG. 1 a conceptual illustration of air flow generated by an air conditioner as embodied and broadly described herein.

That is, as shown in FIG. 1, the flow of cooling/heating air and temperature(s) in particular area(s) of the room may be adapted and improved based on elements affecting thermal adaptability within the room. In particular, a temperature and/or air flow may be changed continuously from an initial air conditioning step to a final air conditioning step to prevent over cooling/heating.

The terms "intensive air conditioning" or "intensive air conditioning step" (including cooling/heating) used hereinafter may refer to an N th operation mode that implements quick cooling or heating at a preset initial operation temperature based on a human air conditioning load, to improve adaptability. The terms "adaptable air conditioning" or "adaptable conditioning step" (including cooling/heating) may refer to implementation of cooling or heating by changing an N th operation temperature and/or air flow at a point of at which a user starts to feel unpleasant or air conditioning load starts to decrease as cooling or heating is implemented at a preset operation temperature.

Figure 2:
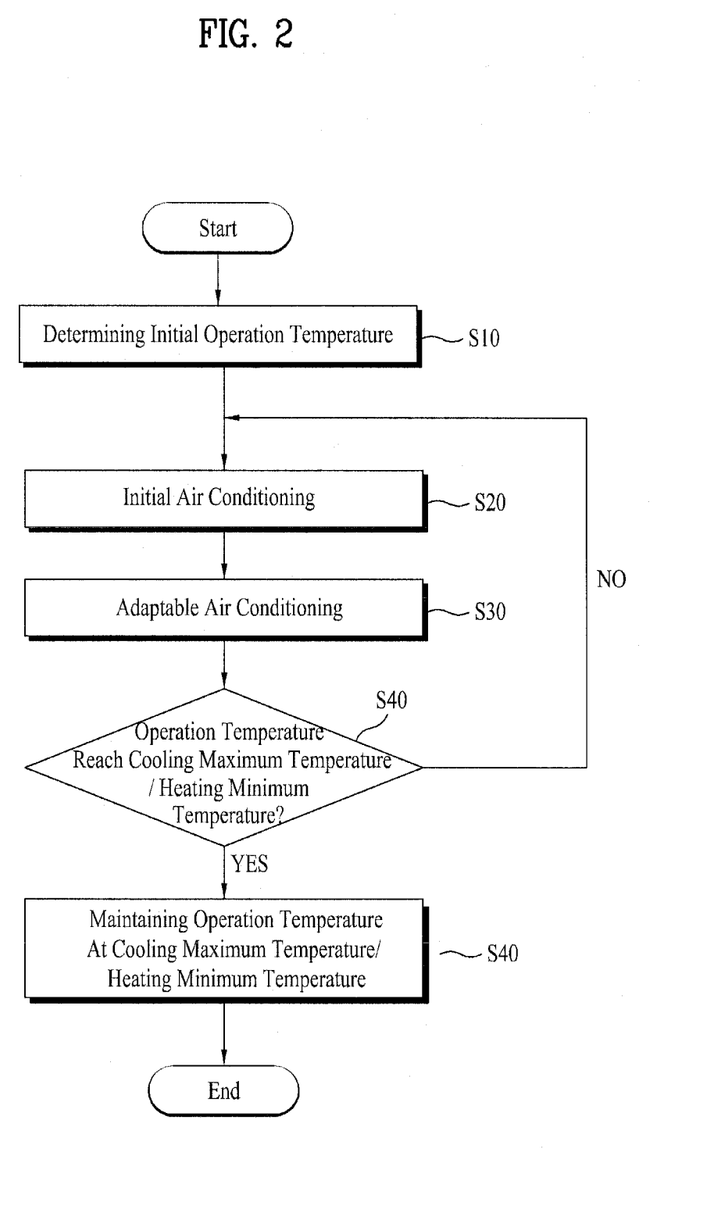
FIG. 2 is a flow chart of a controlling method of an air conditioner as embodied and broadly described herein.
Figure 3A:
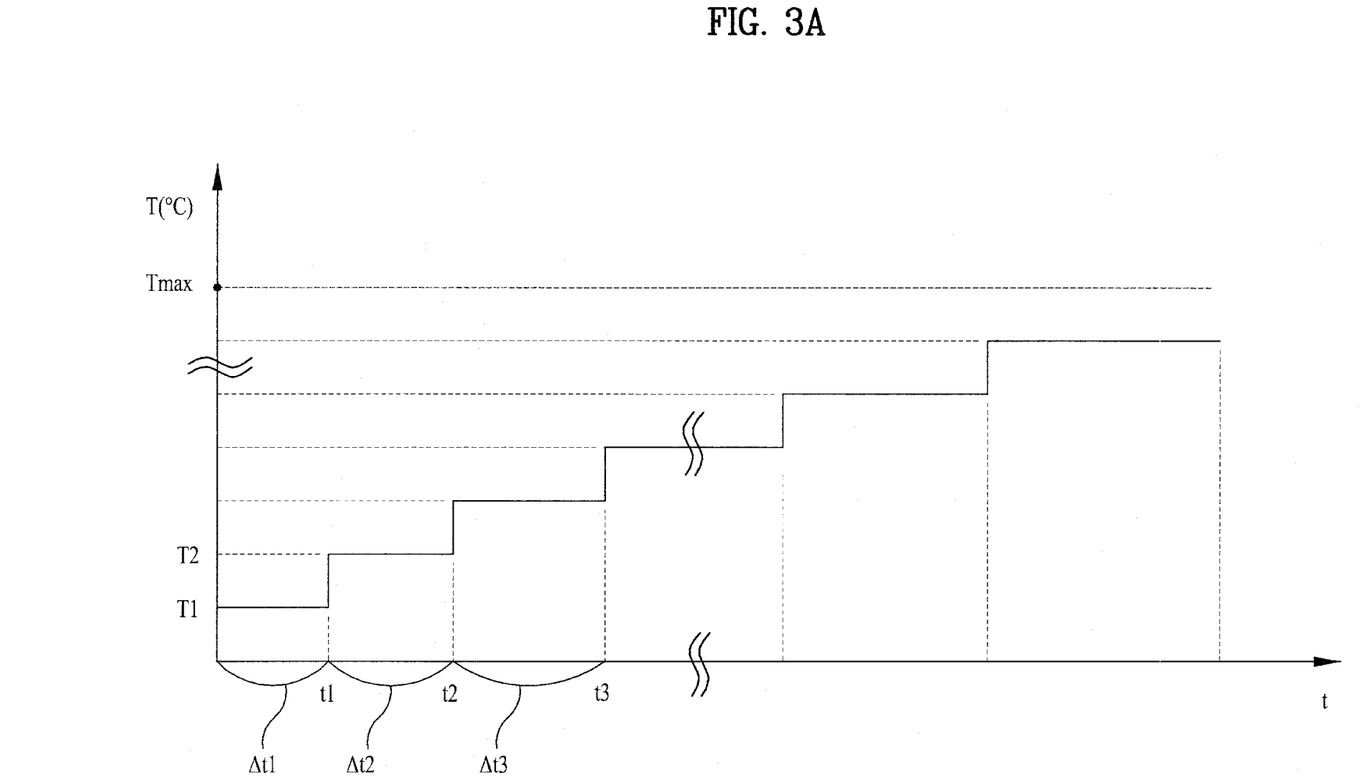
FIGS. 3A and 3B are graphs of temperature over time based on the control method shown in FIG. 2.
Figure 3B:
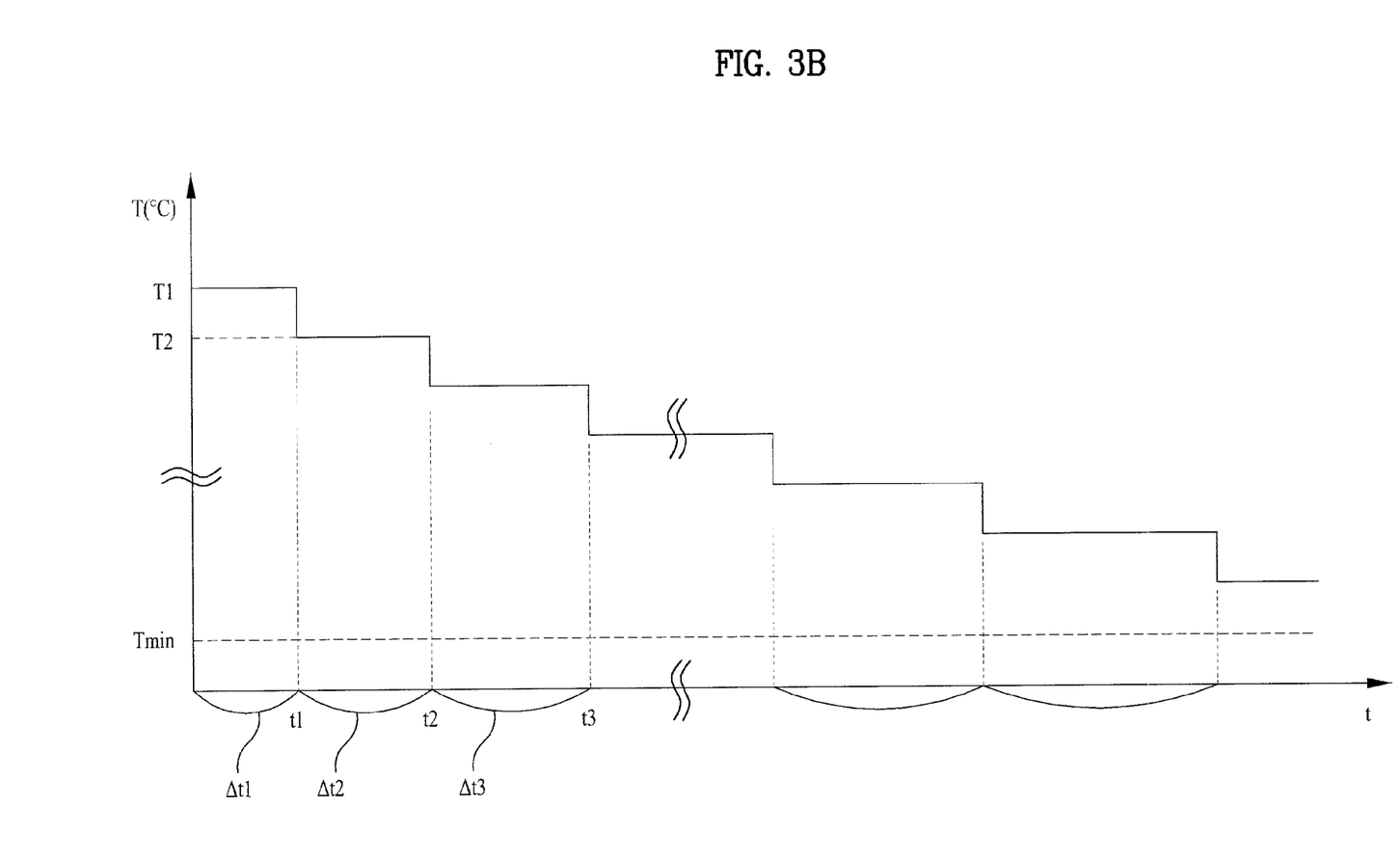

In reference to FIGS. 2 and 3, a controlling method of an air conditioner as embodied and broadly described herein may include determining an initial operation temperature (T1) based on a user's input or a preset program (S10), performing an initial air conditioning process to cool or heat a room at the determined initial operation temperature (T1) for a preset initial operation time period (Δt1) (S20), and performing an adaptable air conditioning process (S30) including increasing or decreasing the room temperature at a plurality of preset operation time periods.

More specifically, the air conditioner may perform a first cooling operation at the first operation temperature (T1) for a preset first operation time period (Δt1). The air conditioner may then implement an adaptable cooling operation, as shown in FIG. 3A, or an adaptable heating operation, as shown in FIG. 3B, at a second operation temperature (T2) that is higher or lower, respectively, than the first operation temperature (T1) for a second operation time period (Δt2) after the first operation time period (Δt1) has elapsed.

It is then determined whether the operation temperature of the air conditioner (or the room temperature) reaches a comfort temperature (S40). When the operation temperature or the room temperature of the air conditioner reaches the comfort temperature, the operation temperature of the air conditioner (or the room temperature) may be maintained at the comfort temperature.

The comfort temperature may be determined based on, for example, a user input pattern or a preset program. For example, in the summer, when using the air conditioner for cooling, a user who has been outdoors may enter the room and may set the air conditioner to the initial operation temperature. Initially, the initial operation temperature may feel pleasant to the user in the room. However, over time, as the user's body cools, the initial operation temperature may seem excessively cool, causing the user to then adjust the initial operation temperature down, to a more comfortable level, or the comfort temperature. In certain embodiments, the air conditioning system may collect this type of usage data over time, and may thus be able to correlate a given initial operation temperature with a corresponding comfort temperature over a given period of time. The air conditioning system may then automatically adjust the initial operation temperature to the comfort temperature after the given period of time based on this usage data. In alternative embodiments, these usage patterns may be preset, stored in the air conditioning system, and automatically implemented by the air conditioning system as appropriate. In a cooling mode, the comfort temperature may be considered a maximum cooling temperature Tmax. In a heating mode, the comfort temperature may be considered a minimum heating temperature Tmin.

In certain embodiments, the comfort temperature in the cooling operation may be, for example, a maximum cooling temperature (Tmax) of approximately 27~29° C. The comfort temperature in the heating operation may be a minimum heating temperature of approximately 18~20° C. Other temperature ranges may also be appropriate.

In certain embodiments, the initial operation temperature may be increased/decreased at a preset temperature interval during the adaptable air conditioning step (S30). The preset temperature interval may be approximately 0.5~2° C., preferably, 1° C.

For example, when the initial operation temperature (target temperature) is 22° C., the cooling target temperature of the adaptable air conditioning step (S30) may be 23° C. If the temperature is changed at an interval of 0.5° C. or less, a user is unlikely to notice any appreciable thermal effect based on this temperature change. However, if the temperature were to be changed more drastically, at, for example, an interval of more than 2° C., the user's skin temperature would also be increased or decreased drastically, thus degrading the user's comfort level.

That is, in, for example, the cooling operation, in the initial air conditioning step (S20) the air conditioner operates at the first operation temperature (T1) for the first operation time period (Δt1). After the first operation time period (Δt1) elapses, the air conditioner operates at the second operation temperature (T2), which is slightly higher than the first operation temperature (T1), for the second operation time period (Δt2). This adaptable air conditioning step (S30) may include a plurality of specific adaptable steps. The plurality of the specific adaptable steps may be continuously implemented to incrementally increase the operation temperature, until the operation temperature (or the room temperature) reaches the comfort temperature (Tmax).

In reference to FIG. 3A, the initial air conditioning step (S20) may be implemented at the initial operation temperature (T1) for the first operation time period (Δt1), and a first adaptable air conditioning step may then be implemented to increase the operation temperature to the second operation temperature (T2), which is greater than the initial operation temperature (T1) by a preset temperature interval, for the second operation time period (Δt2).

In certain embodiments, the second operation time period (Δt2) (e.g. 30 minutes) may be longer than the first operation time period (Δt1) (e.g. 20 minutes). If the air conditioning is implemented at a low temperature (e.g. T1), an initially desired comfort level in the room may be achieved in a relatively short time interval (Δt1). After that, the user may begin to feel cold and the low temperature may generate an unpleasant feeling. At a slightly higher temperature (e.g. T2), the user may remain comfortable longer and may not experience an unpleasant feeling until after the longer time period (Δt2) has elapsed. This may be continued over a number of operation time periods until the comfort temperature is reached. That is, a subsequent adaptable air conditioning step may implement cooling at a slightly higher operation temperature than a previous adaptable air conditioning step for a longer operation time period.

In, for example, a cooling operation, the initial operation time period (Δt1) of the initial air conditioning step may be in proportion to the initial operation temperature (T1). That is, as the initial operation temperature (T1) is lower, quick cooling may be possible, and thus the initial operation time period (Δt1) may be shorter. In this example, subsequent temperatures may get incrementally higher as the corresponding time periods get incrementally longer. A similar relationship may be applied in determining an operation time period corresponding to a particular temperature in a given mode of operation.

This relationship takes into consideration the human cooling load and thermal adaptation discussed above. For example, if the initial operation temperature (T1) is determined to be in a range between 20 and 22° C., an intensive cooling time (the initial operation time period Δt1) may be determined to be in a range between 25 minutes and 35 minutes. If the initial operation temperature (T1) is determined to be in a range between 23° C. and 25° C., an intensive cooling time (the initial operation time period Δt1) may be determined to be in a range between 30 minutes and 40 minutes.

In contrast, in reference to FIG. 3B, in a heating operation, a first heating step (the initial air conditioning step S20) is implemented at the first operation temperature (T1) for the first operation time period (Δt1). After the first operation time period (Δt1) passes, a second heating step (first adaptable air conditioning step S30) is implemented at a second operation temperature (T2), which is lower than the first operation temperature (T1), for the second operation time period (Δt2). The second operation time period (Δt2) may be longer than the first operation time period (Δt1), and the initial operation time of the initial air conditioning step may be in inverse proportion to the initial operation temperature.

Similarly, in reference to FIG. 3B, the initial air conditioning step (S20) is implemented at the initial operation temperature (T1) for the initial operation time period Δt1 and the adaptable air conditioning step (S30) is implemented at the second operation temperature (T2), which is lower than the initial operation temperature (T1) by a preset temperature interval, for the second operation time period (Δt2).

The second operation time period Δt2 (e.g. 30 minutes) may be longer than the first operation time period Δt1 (e.g. 20 minutes). If air conditioning is intensively implemented at a relatively high temperature (e.g. T1), a comfort level in the room may be improved in a relatively short time period (Δt1). If the air conditioning is implemented at a slightly lower temperature (e.g. T2), some discomfort may be generated after a relatively longer time period (Δt2). As shown in FIG. 3B, a next adaptable heating step may implement heating at a lower operation temperature than the operation temperature of the former adaptable heating step, and for a longer operation time period than the former operation time period.

In a heating operation, the difference between the first operation temperature (T1) and the second operation temperature (T2) may be substantially the same as or different from the difference between the second operation temperature (T2) and a third operation temperature implemented in a third operation time period (Δt3).

A duration of the first operation time period (Δt1) may be in inverse proportion to the first operation temperature (T1). That is, as the initial operation temperature (T1) of the air conditioner may be set higher because of a low outdoor temperature, quick heating may be implemented and sufficient heating may be provided to the room within the shorter first operation time period (Δt1).

That is, if initial air conditioning step (S20) is an initial heating step implemented at the initial operation temperature (T1) for the initial operation time period (Δt1), the adaptable air conditioning step (S30) may be implemented as a second heating step at the second operation temperature (T2), which is lower than the first operation temperature (T1) by the preset temperature interval, for the second operation time period (Δt2), which is longer than the initial operation time period (Δt1). This adaptable air conditioning step (S30) may be implemented continuously until the operation temperature of the air conditioner or the room temperature reaches the heating minimum temperature (Tmin), or comfort temperature.

Figure 4:
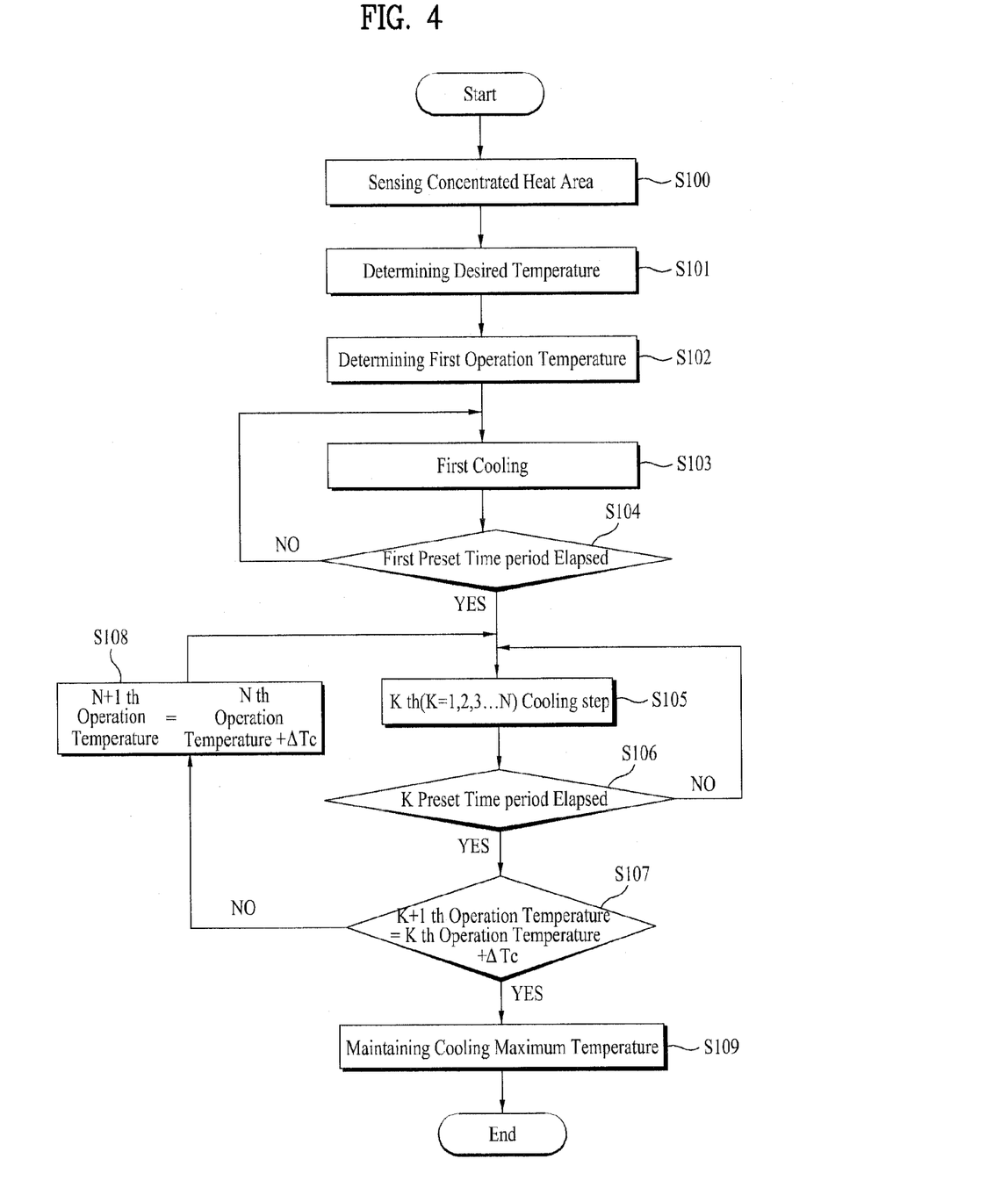
FIG. 4 is a flow chart of a controlling method of an air conditioner according to another embodiment as broadly described herein.

FIG. 4 is a flow chart of a controlling method of an air conditioner according to another embodiment as broadly described herein. In this embodiment, the air conditioner may direct intensive cooling toward a predetermined direction. This controlling method may be applicable to both cooling and heating operations. Simply for ease of discussion, this method will be described in reference to cooling.

The controlling method of the air conditioner according to this embodiment may include a detecting step (S100) in which a position of concentrated source of heat, or a heating absorbing/generating body, such as, for example, the human body, may be detected, a desired temperature determining step (S101) in which a desired temperature, which may be based on a user's input or preset program, is determined when the air conditioner is put into operation, and a first operation temperature (T1) determining step (S102) in which a first operation temperature (T1) is determined. The first operation temperature (T1) may be a cooling target temperature that is higher than the desired temperature.

The detecting step (S100) may be implemented by using a PIR (Passive Infrared Ray) sensor or other type of sensor as appropriate. Such a sensor may be fixed and have a range which encompasses a designated area, or may scan a designated area, to detect areas of concentrated heat. Additionally, such a sensor may sense motion, in addition to, or instead of, heat. The term 'direct blowing mode' may hereinafter refer to an operational mode in which air is directed/blown toward the position at which an area of concentrated heat, such as, for example, a human body, is detected. The term 'indirect blowing mode' may hereinafter refer to an operational mode in which air is directed into the entire space to be cooled or heated.

In the following description, simply for ease of discussion, it will be assumed that the area of concentrated heat corresponds to a human body in the room. However, other sources, such as televisions, computer equipment, kitchen appliances and the like may also generate areas of concentrated heat.

In this embodiment, a position of a human body may be detected in the room, and intensive cooling may be directed in the detected direction. Thus, in this embodiment, in the cooling mode, the first operation temperature (T1) may be a cooling target temperature that is higher than a desired temperature inputted by the user. The difference between the first operation temperature (T1) and the desired temperature may be, for example, approximately 0.5~2° C.

In certain embodiments, a range of desired temperatures may be specified over a plurality of periods. For example, the desired temperature may be determined to be 22.5° C. or lower over the course of a plurality of periods. In this case, the first operation temperature (T1), or cooling target temperature, may be determined to be approximately 24° C. to prevent unnecessary over-cooling and energy waste.

When the position of the human body in the room to be cooled and the first operation temperature (T1) of the air conditioner are determined (S100-S102), a first cooling step (S103) is implemented at the first operation temperature (T1) for a preset first operation time period (Δt1) to cool the room.

In certain embodiments, the air conditioner may include a timer having a preset operation time stored therein corresponding to the operation temperature, and the intensive cooling operation may be implemented at the first operation temperature (T1) for the first operation time period (Δt1) stored in the timer. During the intensive cooling, it is determined whether the first operation time period has elapsed (S104). After the first operation time period (Δt1) has elapsed, an adaptable cooling operation (S105) may be implemented at a second operation temperature (T2), which is higher than the first operation temperature (T1), for a second operation time period (Δt2).

Hence, during a cooling operation, the operation temperature (T) may be continuously increased during the adaptable cooling operation until the operation temperature (T) of the air conditioner reaches the comfort temperature (Tmax).

More specifically, in this embodiment a desired temperature is determined (S101) based on a user's input or a preset program, a first operation temperature, or initial operation temperature (T1), which is higher than the desired temperature, is set (S102), a first cooling step (S103), in which the room is cooled at the first operation temperature (T1) for a first operation time period (Δt1), is performed, and a second to an N th cooling steps are sequentially implemented after the first cooling step. In this embodiment, N may be, for example, greater than or equal to 3, such that at least 3 cooling steps are sequentially performed. A Kth operation temperature, which is an operational temperature in which K=2,3, . . . N−1, may be lower than a K+1 th operation temperature, which is an operational temperature of the K+1 th operation step.

The second to the N th (N≥3) cooling steps may be implemented sequentially after the first cooling step (S102). If the K th (K=12,3, . . . N−1) operation temperature reaches the comfort temperature (Tmax) in the cooling operation, the operation temperature is not increased any more, and the cooling operation may be continued at the K th operation temperature (S109).

During the cooling operation, when the operation temperature of the K cooling step implemented at the K th operation temperature for the K th operation time period is lower than the comfort temperature, the K th operation temperature may be increased by a preset temperature interval (ΔTc) (S108), and a K+1 cooling step may be implemented at a K+1 th operation temperature. If the comfort temperature has not been reached, the K+1 th operation temperature may be sequentially increased to a K+2 operation temperature, K+3 operation temperature until the comfort temperature is reached similar to the system discussed above.

Similar to the previous embodiment, the operation time period of the K+1 (current) cooling step may be longer than the operation time period of the K (previous) cooling step.

As mentioned above, the comfort temperature in the cooling operation may be about 28° C. ~30° C. and the difference between the K+1 th operation temperature and the K th operation temperature may be about 0.5° C. to 2° C. The difference between the K+1 th operation time period and the K th operation time period may be about 5 to 30 minutes.

These parameters may be set in consideration of the human cooling load and thermal adaptation. For example, when the second operation temperature (T2) is determined to be in a range between about 20° C. to 22° C., the second operation time period (Δt2), in which intensive cooling is implemented, may be determined to be in a range between about 25 to 35 minutes. When the second operation temperature (T2) is determined in a range of about 23° C. and 25° C., the second operation time period (Δt2), in which the adaptable cooling is implemented, may be determined to be in a range between about 30 and 40 minutes.

The first operation time period of the intensive cooling step may be in proportion to the second operation temperature (T2). That is, as the second operation temperature (T2) of the air conditioner is lower because of a relatively high outdoor temperature, the first operation time period may be shorter.

Figure 5A:
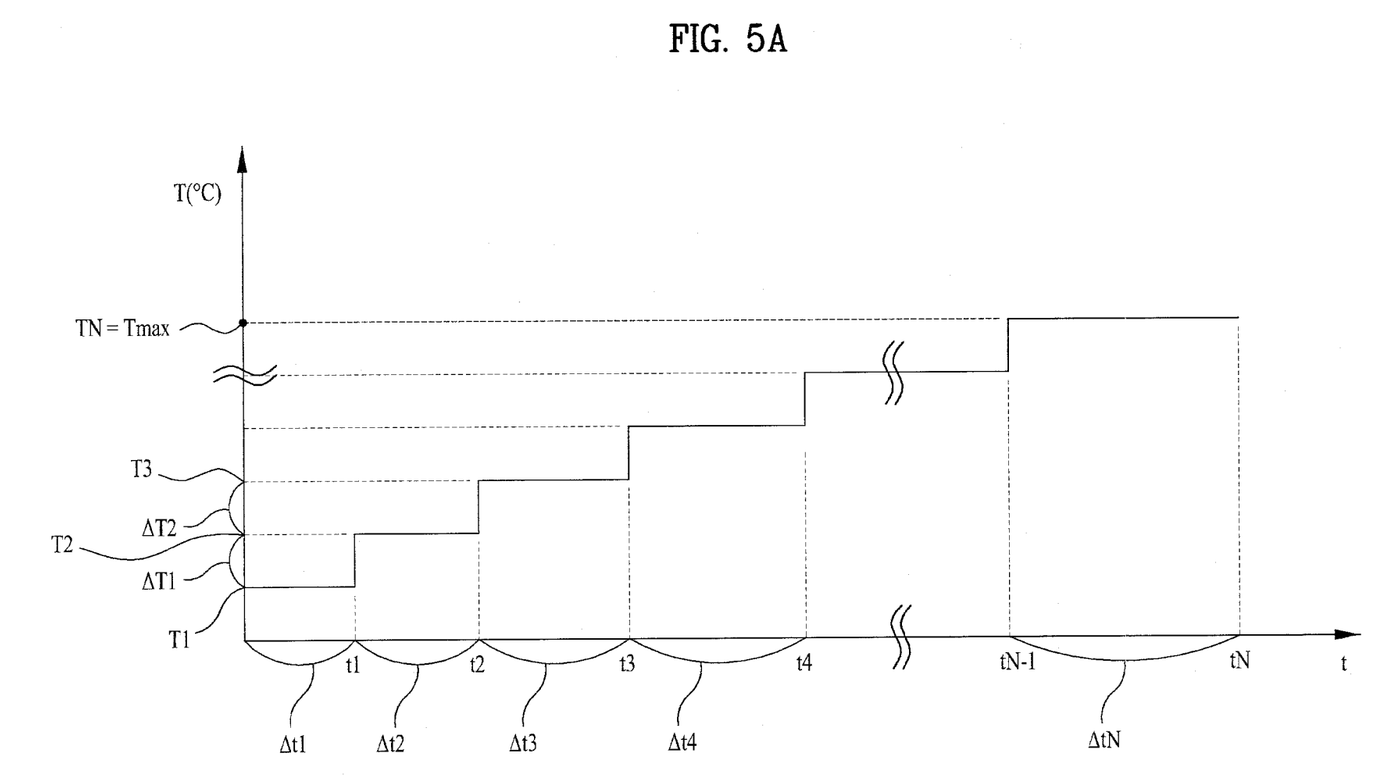
FIGS. 5A and 5B are graphs illustrating a relationship between temperature and time based on the controlling method shown in FIG. 4.
Figure 5B:
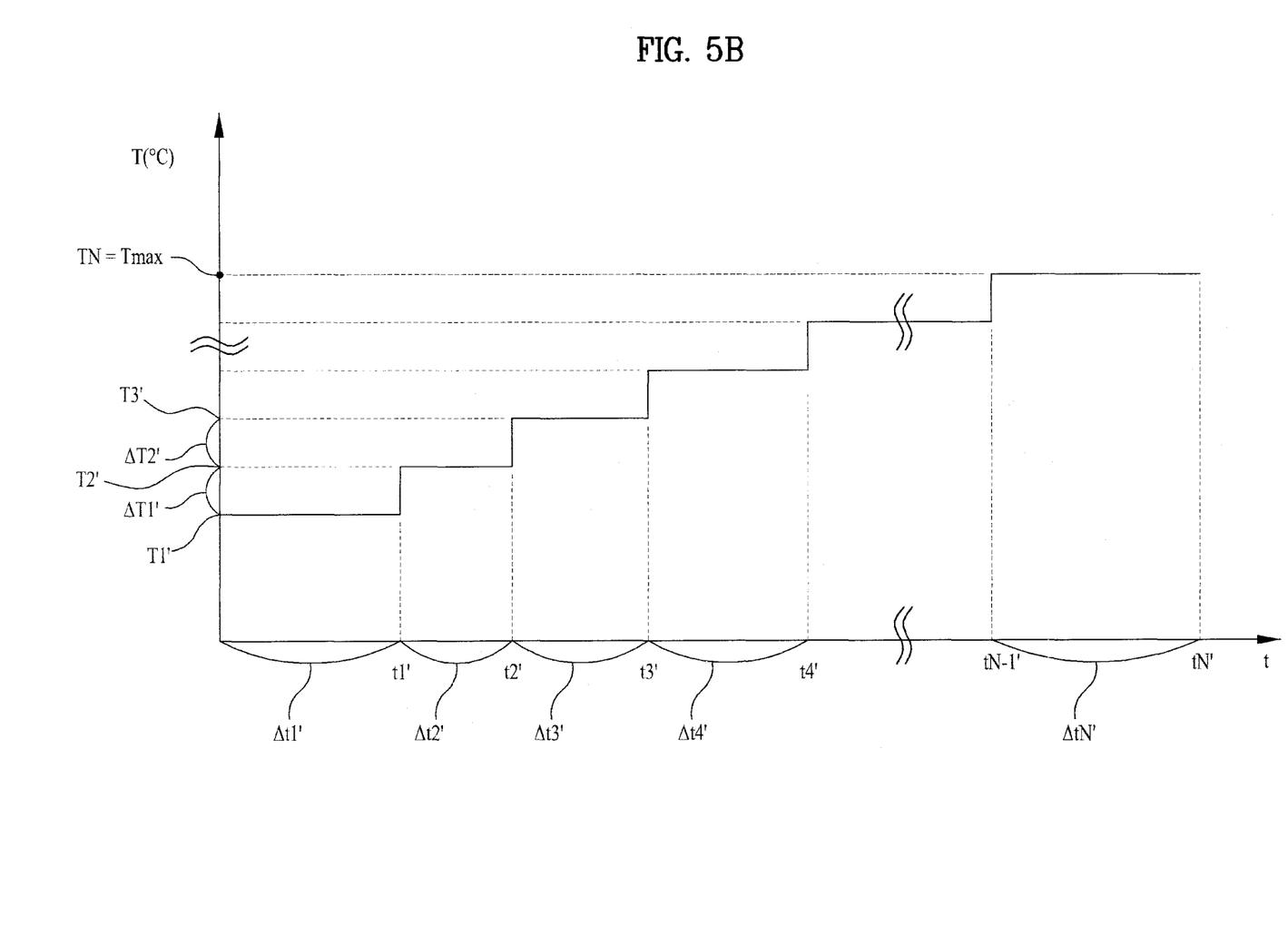

FIGS. 5A and 5B are graphs of the temperature and the time period of the controlling method shown in FIG. 4, in which different examples of the first operation temperature are shown.

In particular, in FIG. 5A the first operation temperature (initial operation temperature) of the first cooling step is T1, and in FIG. 5B the first operation temperature (initial operation temperature) of the first cooling step is T1', T1 being less than T1'.

In reference to FIG. 5A, initial air conditioning is implemented at the first operation temperature (T1) for the first operation time period Δt1. The first adaptable air conditioning is implemented at an operation temperature T2 that is greater than T1 by a preset temperature interval (ΔT1) for a second operation time period (Δt2). In this embodiment, the second operation time period Δt2 (e.g. 30 minutes) may be longer than the first operation time period Δt1 (e.g. 20 minutes).

In reference to FIG. 5B, the initial air conditioning step is implemented at a first operation temperature (T1'), which is higher than (T1), for a first operation time period (Δt1'), which is longer than (Δt1). The adaptable air conditioning step is implemented at a preset operation temperature (T2') that is greater than (T1') by a preset temperature interval (αT1') for a second operation time period (Δt2'). In this embodiment, the second operation time period (Δt2') may be longer than the first operation time period (Δt1').

If (ΔT1), which is the preset temperature interval, is substantially the same as (αT1'), (Δt1') may be preset to be longer than (Δt1). Since the outdoor temperature in the summer is relatively low, the first operation temperature of the air conditioner may be set higher, and then the first operation time period may be proportionally longer.

If intensive cooling is implemented at the low first operation temperature (e.g. T1), a comfort level in the room may be improved within the relatively short first operation time (Δt1) and after that, occupants may begin to feel excessively cold. If the air conditioning is implemented at a somewhat higher first operation temperature (e.g. T1'), occupants may begin to feel excessively cold after the somewhat longer time period (Δt1').

As mentioned above with respect to the embodiment shown in FIG. 4, the initial operation time period of the initial air conditioning step may be in proportion to the initial operation temperature. That is, as the initial operation temperature is lower, quick cooling may be possible and the initial operation time may be shorter.

As a result, the operation time period (Δt1) in which the first cooling step is implemented at the first operation temperature (T1) shown in FIG. 5A may be longer than the operation time period (Δt1) in which the first cooling step is implemented at the first operation temperature (T1') shown in FIG. 5B, as (T1)<(T1'). That is, (Δt1')>(Δt1).

Data including the operation time periods and the operation temperatures of the first to N th cooling steps may be stored in a controller of the air conditioner. When the first operation temperature (initial operation temperature) is determined and a adaptable cooling mode is selected based on the user's input or setting, the room may be cooled or heated based on the operation temperature and the operation time period stored in the controller. That is, the initial operation temperatures of the initial air conditioning step and the operation temperature and operation time period of the adaptable air conditioning step may be determined user preferences, on the assumption of the above relationships including the proportional relationship between the first operation temperature and first operation time period, in the cooling operation, or the inverse-proportional relationship in the heating operation and the relationship between the K th operation time period and the K+1 th operation time period.

In certain embodiments, the air conditioner may include a timer and a temperature sensor so that the operation time may be counted according to a sensed operation temperature for each air conditioning step. As a result, the air conditioner may be operated based on the data, the initial operation temperature and whether it is in the adaptable air conditioning mode, which may be stored in a memory of the controller provided in the air conditioner.

The first to N th cooling steps composing the controlling method of the air conditioner according to this embodiment may be implemented in a direct blowing mode that directs air toward the position of detected area of concentrated heat, and an indirect blowing mode that directs air throughout an entire space of the room. The first cooling step may be started in the direct blowing mode, to reflect the user cooling load and the user's intention of achieving a quick cooling effect in the room.

The direct blowing mode may be continued for a time of, for example, about 10 minutes to 30 minutes, and the indirect blowing mode may be continued for a time of, for example, about 1 minute to 10 minutes. The direct blowing mode may be longer than the indirect blowing mode because the indirect blowing mode has diminishing utility of power consumption, as it cools or heats the entire room, irrespective of the location of the detected area of concentrated heat.

Each of the cooling steps is implemented until the N th air conditioning step is implemented at (TN), as the comfort temperature in the cooling operation (Tmax), which is higher than (TN'-1) for (Δt1) in FIG. 5A is achieved. The N' th air conditioning step is implemented at (TN') as the comfort temperature in the cooling operation (Tmax), which is higher than (TN'-1) for (Δt1') in FIG. 5A is achieved. The indirect blowing mode may be implemented by changing a flow direction of the air conditioner.

Figure 6:
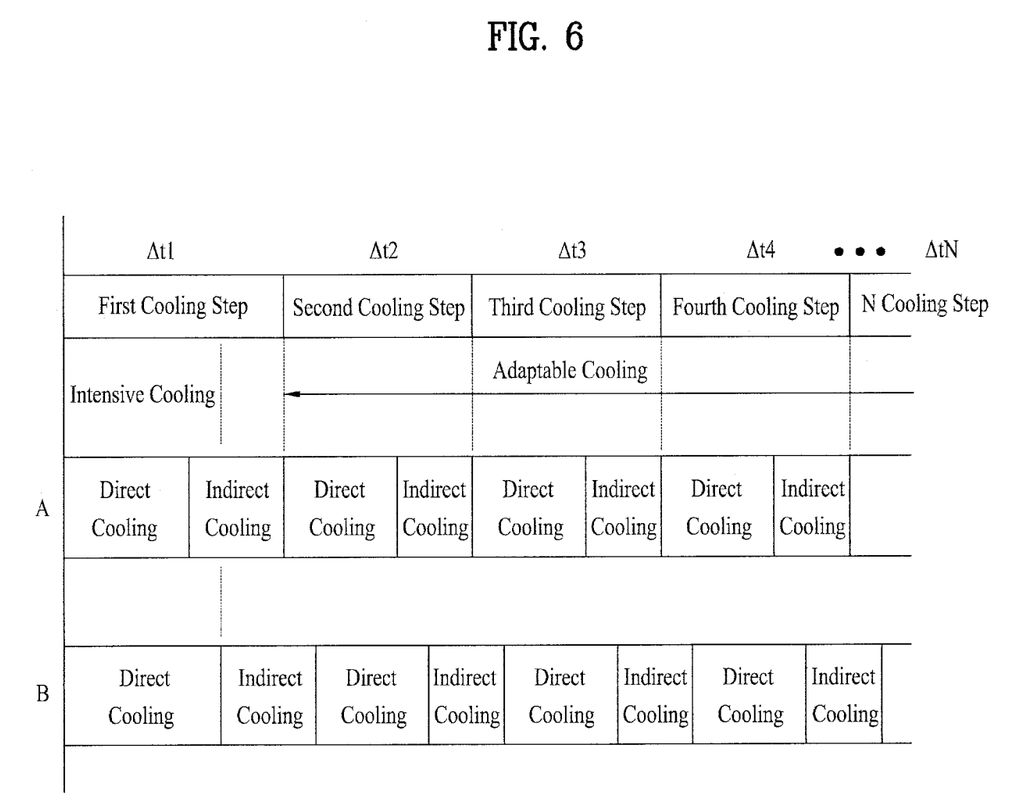
FIG. 6 is a graph of a relationship between flow direction and time based on the controlling method shown in FIG. 4.

FIG. 6 is a graph of a relationship between flow direction and time in the controlling method of the air conditioner according to the embodiment shown in FIG. 4.

In reference to FIG. 6, when the air conditioner is put into operation, the intensive cooling step as initial air conditioning step or the adaptable cooling step as adaptable air conditioning and the direct blowing mode may start at an identical point together (in case of 'A'). The direct blowing mode and the indirect blowing mode irrelevant to the intensive cooling step or the adaptable air conditioning step may be repeated (in case of 'B').

In case of 'B', the first cooling step as the intensive cooling step may be started in the direct blowing mode.

In certain embodiments, the direct blowing mode may be continued for approximately 10 minutes to 30 minutes. The indirect blowing mode may be continued for approximately 1 minute to 10 minutes. In particular, the continuing time of the direct blowing mode may be approximately 20 minutes and that of the indirect blowing mode may be approximately 5 minutes.

The operation time which may be used to determine the temperature change for the adaptable cooling mode, and the operation time which may be used to determine flow direction for direct and indirect blowing, may be counted by two independent timers which may be provided as part of a controller of the air conditioner.

As a result, the initial air conditioning step and the direct blowing mode may be controllable independently. Initial air conditioning and direct blowing may start at the same point, or they may be implemented together in a predetermined period with different start points.

According to controlling method of the second embodiment, when the air conditioner is put into operation, the difference between the room temperature and the outdoor temperature may be calculated. If the calculated difference is at a preset critical temperature, the N th operation temperature, which is the operation temperature in the N air conditioning step, may be maintained.

Figure 7:
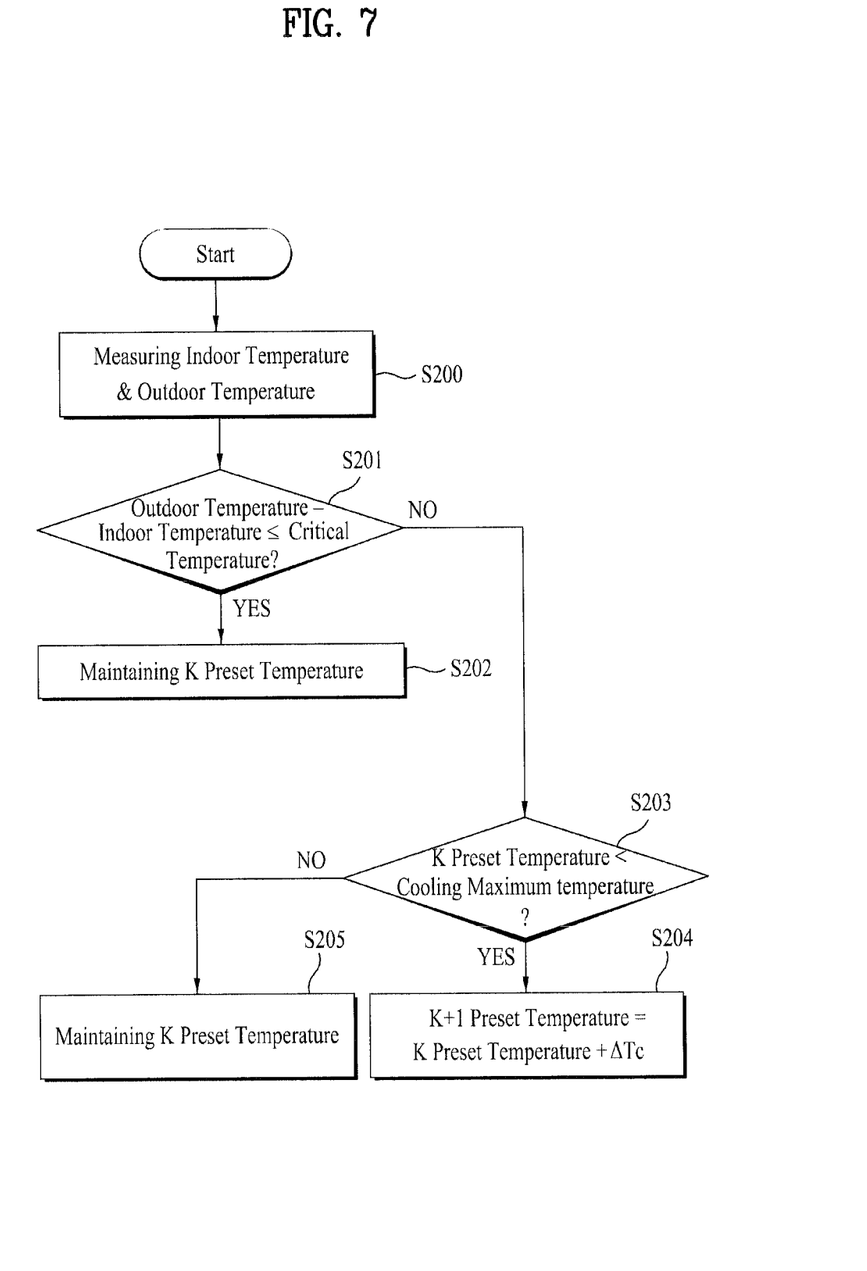
FIG. 7 is a flow chart of a controlling method of an air conditioner according to another embodiment as broadly described herein.

FIG. 7 is a flow chart of a controlling method of an air conditioner according to another embodiment in which a difference between the indoor temperature and the outdoor temperature is taken into consideration.

The user may feel comfortable when a difference between the indoor temperature and the outdoor temperature is maintained below a preset level. To compensate for the difference between the indoor temperature and the outdoor temperature, when the air conditioner is put into a cooling operation at the N th operation temperature, an indoor temperature and an outdoor temperature are measured (S200). The calculated difference is compared with a preset critical temperature difference (S201). If the calculated difference is at or below the preset critical temperature difference, the cooling operation may be maintained at the N th operation temperature, without increasing the operation temperature any more. In certain embodiments, the critical temperature difference may be in a range between approximately 3° C. to 7° C., and in particular, approximately 5° C.

Alternatively, if the difference between the indoor temperature and the outdoor temperature is larger than the preset critical temperature difference, it is determined whether the N th operation temperature is at or below the comfort temperature (in the cooling operation) (S203) as mentioned above. If the N th operation temperature has reached the comfort temperature in the cooling operation, cooling may be continuously implemented at the N th operation temperature (S205). If the N th operation temperature is lower than the comfort temperature in the cooling operation, the N th operation temperature is increased by the preset temperature interval ($\Delta T1$) to the N+1 operation temperature (S204) and the adaptable cooling step may be continuously implemented.

As mentioned above, in air conditioner and a controlling method as embodied and broadly described herein, when the user enters an indoor office or home after outdoor activities, operation temperatures and/or air currents (airflow direction) may be changed from an initial air conditioning step to a final air conditioning step. As a result, more comfortable environmental conditions may be achieved based on human thermal conditions and human thermal adaptable change. In addition, a comfort cooling operation may be provided and over-cooling may be suppressed so that the user's health may be maintained.

Still further, in an air conditioner and a controlling method as embodied and broadly described herein, a proper cooling temperature or proper heating temperature may be maintained or changed continuously from the initial air conditioning step to the final air conditioning step, in response to the human adaptable parameters, and thus, energy may be saved.

Figure 8:
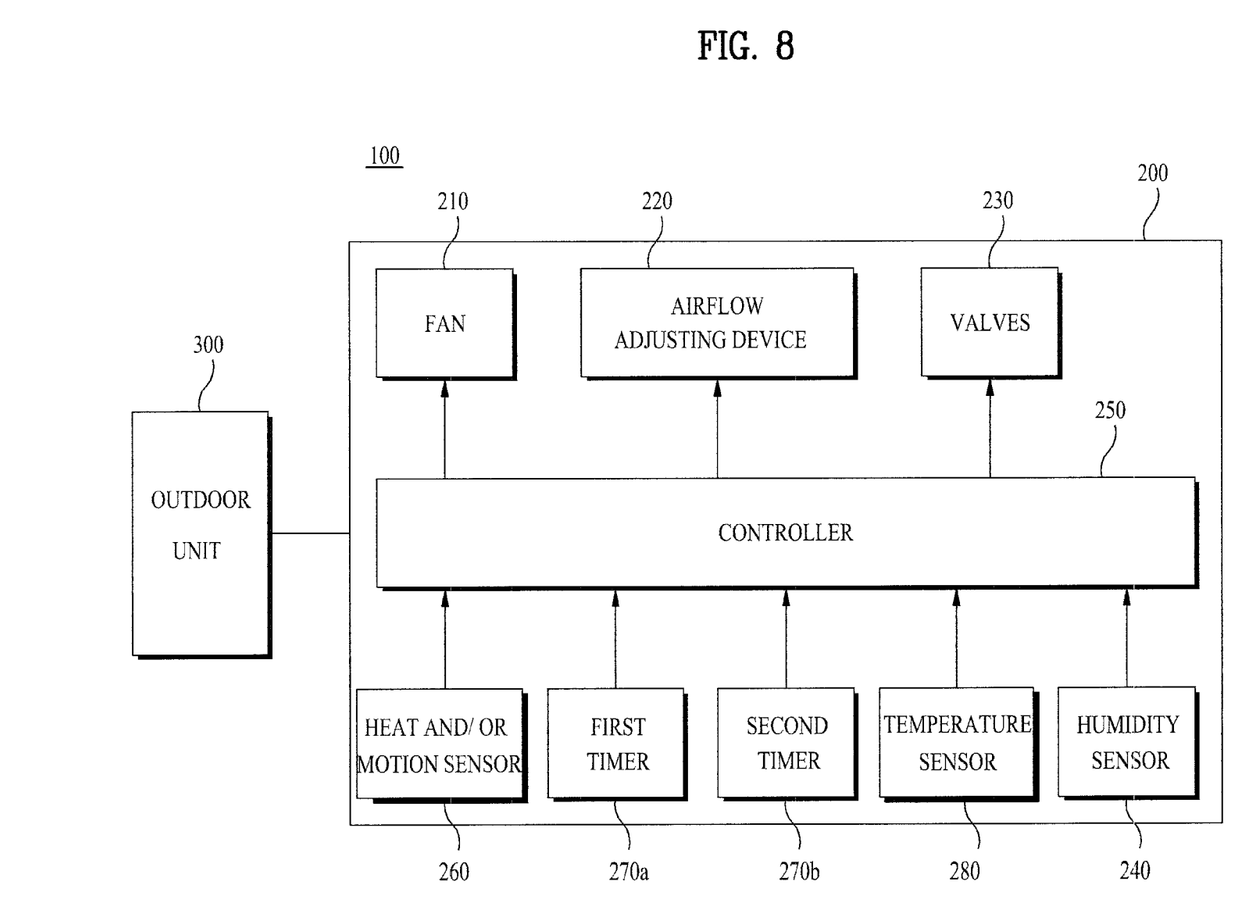
FIG. 8 is a schematic diagram of an air conditioner according to an embodiment as broadly described herein.

FIG. 8 is a schematic diagram of an air conditioner 100 according to an embodiment as broadly described herein, including a heat-exchanger, a fan 210 that blows heat exchanged air into a room, a flow direction adjusting device 220 that adjusts a flow direction of air blown into the room, first and second timers 270a and 270b that count the operation times of the fan 210 and the flow direction adjusting device 220, respectively, and a controller 250 configured to intensively cool the room at a K th (K=1, 2, 3, . . . N−1) operation temperature, which is an initial operation temperature, based on time information received from the first and second timers 270a and 270b, and to cool the room at a K+1 th operation temperature, which is higher than the K th operation temperature, for a K+1 th operation time period, when the K th operation time period has elapsed. The air conditioner 100 may also include an outdoor unit 300 and an indoor unit 200. The outdoor unit and the indoor unit may be formed integrally or independently.

The controller 250 may include a detector 260 that detects a position of an area of concentrated heat, such as, for example, a human body, in the room. The controller 250 receives the time information of the second timer 270b and controls the flow direction adjusting device 220 to blow the air toward the position of the detected body for a preset direct cooling time period. When the direct cooling time period has elapsed, the controller 250 may control the flow direction adjusting device 220 to blow the air throughout the entire space of the room for a preset indirect cooling time period. The air conditioner 100 may also include a temperature sensor 280, a humidity sensor 290 and a variety of valves 230 that adjust/control an amount of refrigerant. In addition, to determine a critical temperature difference, an auxiliary temperature sensor may also be provided in the outdoor unit 300.

As mentioned above, according to the controlling method of the air conditioner having this structure, the controller intensively cools the room at the K th (K=1, 2, 3, . . . N−1) operation temperature, which is the initial operation temperature, based on the time information received from the first and second timers, and it cools the room at the K+1 th operation temperature, which is higher than the K th operation temperature, for the K+1 th operation time period, when the K th operation time period has elapsed.

An air conditioner is provided which can implement cooling or heating in consideration of a user cooling load and changes of human thermal adaptable, and a controlling method thereof.

In air conditioner and a controlling method thereof, as embodied and broadly described herein, when the user enters an indoor office or home after outdoor activities only to use the air conditioner, operation temperatures and/or air currents may be changed from an initial air conditioning step to a last air conditioning step. As a result, a continuous pleasant feeling may be given to the user in consideration of human thermal improvement and human thermal adaptable change. In addition, a comfort cooling operation may be provided and an over-cooling which may be a cause of air-conditioning it is may be suppressed and the user's health may be maintained accordingly.

In an air conditioner and a controlling method thereof, as embodied and broadly described herein, a proper cooling temperature or proper heating temperature may be maintained or changed continuously from the initial air conditioning step to the last air conditioning step, in response to the human adaptability. As a result, energy may be saved.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A controlling method of an air conditioner, the method comprising:
    receiving an externally input temperature;
    determining an initial operation temperature based on the received externally input temperature or a preset program temperature;
    cooling or heating a designated space at the determined initial operation temperature for an initial operation time period; and
    after the initial operation time period has elapsed, cooling or heating the designated space to a comfort temperature, wherein the externally input temperature is a temperature between the initial operation temperature and the comfort temperature in both a cooling operation and a heating operation of the air conditioner,
    wherein cooling or heating the designated space to a comfort temperature comprises incrementally increasing or decreasing a room temperature to the comfort temperature, comprising:
    increasing or decreasing a current temperature by a preset temperature interval and re-setting the current temperature accordingly;
    cooling or heating the designated space at the re-set current temperature for a preset time interval, including increasing the preset time interval each time the current temperature is increased or decreased such that a current time interval is greater than a previous time interval; and
    repeating the increasing or decreasing and the cooling or heating steps until the room temperature reaches the comfort temperature.

2. The method of claim 1, wherein the initial operation time period is proportional to the initial operation temperature in the cooling operation.

3. The method of claim 1, wherein the initial operation time period is inversely proportional to the initial operation temperature in the heating operation.

4. The method of claim 1, wherein cooling or heating the designated space comprises cooling the designated space to a comfort temperature between approximately 27° C. and 29° C. in the cooling operation.

5. The method of claim 1, wherein cooling or heating the designated space comprises heating the designated space to a comfort temperature between approximately 18° C. and 20° C. in the heating operation.

6. The method of claim 1, wherein incrementally increasing or decreasing a room temperature to the comfort temperature comprises incrementally increasing or decreasing the room temperature by an interval of 1° C.

7. The method of claim 1, wherein the comfort temperature is based on previously collected and stored usage data.

8. A controlling method of an air conditioner, the method comprising:
    determining a desired temperature based on an external input or a preset program;
    performing an intensive cooling or heating operation to change a temperature of a designated space by a predetermined amount within a predetermined period of time; and
    thereafter performing an adaptive cooling or heating operation to incrementally change the temperature of the space over corresponding increments of time based on previously stored usage data or the preset program, comprising:
    determining an initial operation temperature that is less than the desired temperature and cooling the space at the determined operation temperature for a corresponding operation time period;
    after the corresponding operation period has elapsed, increasing the operation temperature by a predetermined interval and re-setting the operation temperature, and cooling the space at the re-set operation temperature for a corresponding operation time period; and
    continuing to incrementally increase the operation temperature by the predetermined interval and cool the space at the re-set operation temperature for the corresponding operation time period until the operation temperature reaches a comfort temperature that is greater than the initial operation temperature,
    wherein a duration of a current operation time period is greater than a duration of an immediately previous operation time period.

9. The method of claim 8, further comprising maintaining the operation temperature when the operation temperature reaches the comfort temperature.

10. The method of claim 8, further comprising:
    detecting position associated with an area of concentrated heat, wherein performing an intensive cooling or heating operation comprises performing a direct blowing operation to blow cooled or heated air toward the detected position of the area of concentrated heat.

11. The method of claim 10, further comprising performing an indirect blowing operation to disperse cooled or heated air throughout the designated space.

12. The method of claim 10, wherein performing the intensive cooling or heating operation is initiated simultaneously with performing the direct blowing operation.

13. The method of claim 10, performing the direct blowing operation comprises performing the direct blowing operation for approximately 10 minutes to 30 minutes.

14. The method of claim 10, further comprising performing an indirect blowing operation for approximately 1 minute to 10 minutes to disperse cooled or heated air throughout the designated space.

15. The method of claim 14, further comprising alternately and repeatedly performing the direct blowing operation and the indirect blowing operation so as to maintain the comfort temperature.

* * * * *